United States Patent
Kobayashi

(12) 
(10) Patent No.: US 6,417,254 B1
(45) Date of Patent: Jul. 9, 2002

(54) PARTICULATE DIACETAL COMPOSITION, PROCESS FOR PRODUCING THE SAME, AND POLYOLEFIN RESIN COMPOSITION AND MOLDING

(75) Inventor: Toshiaki Kobayashi, Nara (JP)

(73) Assignee: New Japan Chemical Co., Ltd., Kyoto (JP)

( * ) Notice: Subject to any disclaimer, the term of this patent is extended or adjusted under 35 U.S.C. 154(b) by 0 days.

(21) Appl. No.: 09/355,761

(22) PCT Filed: Feb. 2, 1998

(86) PCT No.: PCT/JP98/00420

§ 371 (c)(1),
(2), (4) Date: Aug. 4, 1999

(87) PCT Pub. No.: WO98/33851

PCT Pub. Date: Aug. 6, 1998

(30) Foreign Application Priority Data

Feb. 4, 1997 (JP) .............................................. 9-037194

(51) Int. Cl.⁷ ................................................ C08K 5/15
(52) U.S. Cl. ....................................................... 524/108
(58) Field of Search ......................................... 524/108

(56) References Cited

U.S. PATENT DOCUMENTS 4,388,119 A    6/1983   Uchiyama

FOREIGN PATENT DOCUMENTS

| EP | 0 596 525 A1 | 5/1994 |
|---|---|---|
| JP | 62050355 | 3/1983 |
| JP | 1-126352 | 5/1989 |
| JP | 8-245843 | 9/1996 |

*Primary Examiner*—Peter D. Mulcahy
(74) *Attorney, Agent, or Firm*—Larson & Taylor PLC

(57) ABSTRACT

The present invention provides a granulated diacetal composition comprising (a) a powder of a diacetal such as 1,3:2,4-bis-O-(benzylidene)-D-sorbitol or a nuclearly substituted product and (b) a binder, the granulated diacetal composition being prepared by agitating a mixture containing a starting diacetal powder and the binder at a temperature equal to or higher than the melting point or softening point of the binder and lower than the melting point of the diacetal, molding the resulting compound into grains, or by pulverizing the grains obtained by said molding, the diacetal particles in the granulated diacetal composition being bonded to each other via the binder and aggregated, the binder in the granulated diacetal composition coating a part or the whole of the surface of each diacetal particle or adhering to a part or the whole of the surface of each diacetal particle, and a process for preparing the same, as well as a resin composition obtainable from the granulated diacetal composition and a polyolefin resin, and a molded article obtainable from the resin composition.

22 Claims, No Drawings

PARTICULATE DIACETAL COMPOSITION, PROCESS FOR PRODUCING THE SAME, AND POLYOLEFIN RESIN COMPOSITION AND MOLDING

TECHNICAL FIELD

The present invention relates to a novel and useful granulated diacetal composition, a process for preparing the same, and polyolefin resin composition and molded articles prepared with use of the diacetal composition.

BACKGROUND ART

Diacetals, typically dibenzylidene sorbitol and nuclearly substituted products thereof, are functional agents widely used as nucleating agents for polyolefin resins, gelling agents for various fluids or the like.

Conventional commercial products of diacetals are in the form of bulky fine powders having an apparent specific gravity of about 0.1 to 0.2. A method has been proposed wherein a diacetal powder is further pulverized into an ultrafine powder for improving the dissolution of the diacetal powder in polyolefin resins (Japanese Unexamined Patent Publication No. 145431/1994).

Ultrafine powders have poor transferability because of their small apparent specific gravity of 0.1 or less, and are liable to cause bridging in piping or hoppers and likely to generate dust which increases the risk of dust explosion. Further, they tend to agglomerate to form solid cakes during storage, lacking in storage stability.

Similarly, fine powders of diacetals are likely to generate dust when added to resins or fluids. Since the powders have stacking property (strong adhesion between the particles), they have poor flow property and tend to cause bridging in piping or hoppers. Further, they are likely to agglomerate during storage.

It has been therefore necessary to take sufficient measures for improving the transferability and storage stability of fine powders, for preventing dust explosion, and for maintaining working environment free from dust. However, no method is known which solves the problems of diacetal powders with respect to transferability, dust, storage stability, etc.

Incidentally, a process for granulating additives for plastics are known. DE 3639874 discloses a process and apparatus for preparing a granular additive by mixing an additive such as filler, nucleating agent, coloring agent, UV absorber, antioxidant, light stabilizer or the like with a carrier or binder which is active at 100° C. or lower, and compressing the mixture at 100° C. or lower. However, said publication does not specify the kinds of the nucleating agent and binder. Accordingly, the disclosed technique is not one proposed for improving transferability and for taking dust-preventive measures with respect to a specific compound.

Japanese Examined Patent Publication No. 423/1989 and Japanese Unexamined Patent Publication No. 126352/1989 describe that a powdery diacetal composition comprising diacetal particles coated with a higher fatty acid can be obtained by adding a powdery diacetal to an aqueous emulsion containing a higher fatty acid, stirring the mixture, and separating the powder, followed by drying, and that resin compositions containing the diacetal composition are improved in transparency, rigidity, and like properties.

Japanese Unexamined Patent Publication No. 245843/1996 teaches a powdery composition comprising a diacetal particles as intimately mixed with a carboxylic acid amide or behenic acid, the powdery composition being prepared by mixing a diacetal powder with a solution or dispersion of carboxylic acid amide or behenic acid in a solvent and removing the solvent; or a powdery diacetal composition comprising diacetal particles which are coated with carboxylic acid amide on the surface, the powdery diacetal composition being prepared by adding a diacetal powder to a liquid emulsion of carboxylic acid amide and evaporating the solvent for drying. The publication discloses that use of carboxylic acid amide particularly lowers the melting point of the diacetal and enables molding at lower temperatures.

However, the above powdery compositions are liable to agglomerate during storage by fusion or the like, since the coating material has a relatively low melting point or is likely to undergo secondary crystallization. Furthermore, the flow property or transferability of the powdery compositions are not remarkably improved partly because the compositions have a small apparent specific gravity of up to 0.38.

Stated more specifically, according to the processes of Japanese Examined Patent Publication No. 423/1989 and Japanese Unexamined Patent Publication No. 126352/1989, the surfaces of diacetal particles are coated with a higher fatty acid. However, the flow property of the powdery composition was insufficient partly because of its small apparent specific gravity of about 0.3. Further, the composition is very liable to agglomerate at about 60° C. or under load.

According to the process of Japanese Unexamined Patent Publication No. 245843/1996, a solvent is essential in the mixing step, necessitating use of a large solvent recovery system and mixing apparatus. Thus, the process is of economically low value. Furthermore, the resulting powdery composition has an insufficient flow property partly because the composition has a small apparent specific gravity of about 0.3 due to the pores which have been made presumably when the solvent is removed.

DISCLOSURE OF THE INVENTION

An object of the present invention is to provide, by an economical process, a novel and useful diacetal composition in the form of a commercial product, which is excellent in workability in automatic metering and the like, is highly safe in respects of prevention of dust generation, prevention of explosion, and the like, is excellent in transferability in piping or hoppers, is easily handled without generating dust, and is good in storage stability, while not impairing the resin-modifying properties, solubility or dispersibility in molten resins and characteristics of gelling ability which are inherently possessed by diacetals.

The present inventor conducted extensive researches to solve the above problems, and considered that if a composition comprising a diacetal as an essential component is formed into fine particles (or ultrafine particles) or grains having an apparent specific gravity of 0.4 or more, in particular 0.5 or more, without using a special large apparatus for solvent recovery or the like, then the transferability would be improved and the dust problem would be solved, and the size of containers for storing or transporting a diacetal powder would become compact.

On the other hand, there was concern that the increase in the apparent specific gravity, achieved by forming the diacetal into grains, would impair the resin-modifying properties, solubility or dispersibility in molten polyolefin resins or characteristics of gelling ability which are inherently possessed by diacetals, because a large apparent specific gravity resulting from granulation would be considered to be incompatible with good solubility or dispersibility in molten polyolefin resins. For example, it was considered that if a diacetal powder was formed into grains by compression, the diacetal crystals constituting the particles of the diacetal powder would aggregate more densely and the dispersibility or solubility in molten polyolefin resins would decrease.

Under the circumstances, the inventor carried out further extensive research, and found that a granulated diacetal composition having an increased apparent specific gravity and good storage stability and transferability can be obtained by mixing a diacetal powder with a melt of a specific binder (not in the form of a solution or dispersion of the binder in water, an organic solvent or like liquid medium, that is to say, without using such a liquid medium which is required to be recovered during the production process) and molding the resulting mixture into grains or by pulverizing the obtained grains. It has also been found that surprisingly the obtained granulated composition, in spite of having an increased apparent specific gravity, has improved dispersibility or solubility in molten polyolefin resins, and therefore achieves the above object.

Thus, the inventor found that the above object can be achieved by granulated diacetal composition or pulverization product thereof, the composition being prepared by agitating a mixture containing a diacetal powder and a binder at a temperature equal to or higher than the melting point or softening point of the binder and lower than the melting point of the diacetal to thereby coat the surfaces of diacetal particles, and forming the obtained compound into grains. The present invention has been accomplished based on these findings.

The present invention provides a granulated diacetal composition comprising a powder of a diacetal represented by the formula (1)

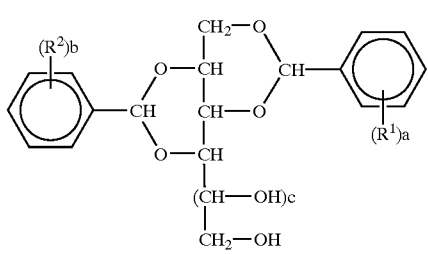

(1)

wherein $R^1$ and $R^2$ are the same or different and each represents a hydrogen atom, an alkyl group having 1 to 4 carbon atoms, an alkoxy group having 1 to 4 carbon atoms, or a halogen atom, a and b each represents an integer of 1 to 5, and c represents 0 or 1, and a binder, the granulated diacetal composition being prepared by agitating a mixture containing a starting powder of the diacetal represented by the formula (1) and the binder at a temperature equal to or higher than the melting point or softening point of the binder and lower than the melting point of the diacetal, and molding the obtained compound into grains, or by pulverizing the grains thus obtained by said molding, the diacetal particles in the granulated diacetal composition being bonded to each other via the binder and aggregated, and the binder in the granulated diacetal composition coating a part or the whole of the surface of each diacetal particle or adhering to a part or the whole of the surface of each diacetal particle.

The diacetal fine crystals constituting the diacetal particles in the granulated diacetal composition aggregate more densely than the diacetal fine crystals constituting the particles of the starting diacetal powder, as a result of compression during the processing step for granulation.

The present invention further provides a polyolefin resin composition obtainable from the granulated diacetal composition of the invention and a polyolefin resin, as well as a molded article obtainable from the polyolefin resin composition.

According to the present invention, a pressure is applied to the starting diacetal powder by the procedures such as compression at a predetermined compression ratio, agitation, extrusion and the like in the processing step for granulation. As a result, the diacetal fine crystals constituting the diacetal particles aggregate more densely. Therefore, the diacetal fine crystals constituting the diacetal particles in the granulated diacetal composition aggregate more densely than the diacetal fine crystals of the particles of the starting diacetal powder, consequently increasing the apparent specific gravity.

Of the granulated diacetal compositions of the invention, the grains obtained by molding the compound of the diacetal powder and the binder into grains comprises numerous diacetal particles bonded to each other via the binder and aggregated, wherein the binder coats a part or substantially the whole of the surface of each diacetal particle.

The granulated diacetal composition obtained by pulverizing the above grains obtained by the molding also comprises a plurality of diacetal particles bonded to each other via the binder and aggregated wherein the binder coats a part or the whole of the surface of each diacetal particle.

In either composition, substantially no binder is present within the interior of the diacetal particles.

The present invention will be described below in further detail.

Diacetal

In the formula (1), examples of the alkyl group having 1 to 4 carbon atoms may be methyl, ethyl, n-propyl, isopropyl, isobutyl, n-butyl and the like. Examples of the alkoxy group having 1 to 4 carbon atoms include methoxy, ethoxy, n-propoxy, isopropoxy, n-butoxy and the like. The halogen atom may be chlorine, bromine, fluorine, etc.

a and b each represent an integer of 1 to 5, preferably 1 to 3. c is preferably 1.

The position(s) of the substituents represented by $R^1$ and $R^2$ may be o-, m- or p-position when a and b are 1, and may be, for example, 2,4-, 3,4- or 3,5-positions when a and b are 2, and may be, for example, 2,4,5- or 3,4,5-positions when a and b are 3.

Typical examples of the diacetals represented by the formula (1) are:

1,3:2,4-bis-O-(benzylidene)-D-sorbitol,
1,3:2,4-bis-O-(p-methylbenzylidene)-D-sorbitol,
1,3:2,4-bis-O-(p-ethylbenzylidene)-D-sorbitol,
1,3:2,4-bis-O-(p-isopropylbenzylidene)-D-sorbitol,
1,3:2,4-bis-O-(2,4-dimethylbenzylidene)-D-sorbitol,
1,3:2,4-bis-O-(3,4-dimethylbenzylidene)-D-sorbitol,
1,3:2,4-bis-O-(3,5-dimethylbenzylidene)-D-sorbitol,
1,3:2,4-bis-O-(2,4,5-trimethylbenzylidene)-D-sorbitol,
1,3:2,4-bis-O-(p-chlorobenzylidene)-D-sorbitol,
1,3-O-benzylidene-2,4-O-(2,4-dimethylbenzylidene)-D-sorbitol,
1,3-O-(2,4-dimethylbenzylidene)-2,4-O-benzylidene-D-sorbitol,
1,3-O-benzylidene-2,4-O-(3,4-dimethylbenzylidene)-D-sorbitol,
1,3-O-(3,4-dimethylbenzylidene)-2,4-O-benzylidene-D-sorbitol, and the like. They can be used singly or as a mixture of two or more.

These diacetals are known and easily available, or can be easily prepared by a known process.

In the present invention, the diacetal is used in the form of a powder. The particle size thereof is not limited, and usable are powdery products now commercially available and diacetals occurring during the production thereof, which is made into a powder.

The apparent specific gravity of such starting diacetal powder is usually about 0.1 to 0.2, or about 0.3 at the most.

It is generally advantageous that the starting diacetal powder have an average particle size of about 1 μm to about 1 mm, preferably about 10 μm to about 500 μm.

The average particle size (μm) of the diacetal powder is determined with a particle size distribution measuring apparatus with laser diffraction/scattering "LA-910" (trade name), manufactured by Horiba Seisakusho.

Binder

Binders used for maintaining the diacetal in the grain form are organic compounds having a melting point or softening point (e.g., 230° C. or lower, preferably 200° C. or lower, in particular 0° C. to 180° C.) which is equal to or lower than the melting point of the diacetal to be used.

When such binder is used, as liquified by heating where necessary while maintaining the diacetal in the solid state, and the resulting powder, paste or composition is molded into grains by a granulation process such as kneading and extrusion, tableting by compression or the like, and the obtained grains are cooled, then such binder exhibits a binder effect to give a diacetal grains (in the form of tablets, pellets, granules, etc.) having a large apparent specific gravity and good flow property, transferability and storage stability.

Specific examples of the binder recommended for use in the present invention include at least one organic compound selected from the group consisting of higher fatty acids, higher alcohols, polypropylene glycols, fatty acid alkyl esters, polycarboxylic acids which may have one hydroxyl group, esters of polycarboxylic acids which may have one hydroxyl group, polyhydric alcohol fatty acid esters, polyoxyethylene higher alkyl ethers, polyoxyethylene alkyl phenyl ethers, aliphatic hydrocarbons, oils, fats, higher fatty acid amides, rosins and rosin derivatives, said organic compounds having a melting point or softening point lower than the melting point of the diacetal to be used, and said organic compounds preferably having a melting point or softening point of 200° C. or lower, in particular about 0° C. to 180° C.

Recommended higher fatty acids are $C_{14-40}$, preferably $C_{16-24}$, saturated or unsaturated fatty acids, among which stearic acid, isostearic acid, behenic acid, dimer acid and the like are particularly preferred.

Recommended higher alcohols are $C_{8-40}$, preferably $C_{16-24}$, straight- or branched-chain saturated or unsaturated aliphatic alcohols, among which stearyl alcohol, behenyl alcohol, 2-hexyldecanol, 2-octyl-dodecanol, 2-decyltetradecanol and like dimerized alcohols are particularly preferred.

Preferred polypropylene glycols are those having a molecular weight of about 400 to about 7,000.

Recommended fatty acid alkyl esters are esters of a $C_{8-22}$, preferably $C_{14-18}$, saturated or unsaturated fatty acid with a $C_{4-22}$ straight- or branched-chain saturated aliphatic alcohol, among which butyl stearate, octyl stearate and the like are particularly preferred.

Recommended as the polycarboxylic acid which may have one hydroxyl group or esters of the polycarboxylic acid which may have one hydroxyl group are polycarboxylic acids, such as di-, tri- or tetracarboxylic acids, which have about 2 to about 18 carbon atoms and which may have one hydroxyl group, and esters, in particular mono-, di- or triesters, of said polycarboxylic acid which may have one hydroxyl group with a $C_{2-22}$ saturated or unsaturated aliphatic alcohol. Examples of the polycarboxylic acid which may have one hydroxyl group include succinic acid, citric acid, malic acid, acetylcitric acid, adipic aid, cebacic acid, hexahydrophthalic acid, butanetetracarboxylic acid and the like. They are used as such or as an acid component for the preparation of the esters of the polycarboxylic acid which may have one hydroxyl group. The $C_{2-22}$ saturated or unsaturated aliphatic alcohol component may be, for example, butanol, 2-ethylhexyl alcohol, isononyl alcohol, lauryl alcohol, stearyl alcohol, oleyl alcohol, cetyl alcohol, behenyl alcohol, n-octanol and the like. Preferred esters of malic acid are malic acid monoalkyl ($C_{2-22}$) esters. Among these esters of a polycarboxylic acid which may have one hydroxyl group, particularly preferred are citric acid mono- (di- or tri-) stearyl ester, malic acid monostearyl ester, tributyl acetylcitrate, 2-ethylhexyl dipate, n-octyl adipate, diisononyl adipate, lauryl adipate and the like.

Examples of the polyhydric alcohol fatty acid esters (including complete esters and partial esters) are complete or partial esters of a di- to hexa-hydric alcohol with a $C_{8-22}$ fatty acid. Particularly recommended are mono- (or di-) esters of glycerin with a $C_{8-22}$ fatty acid and their acetylation products, sorbitan fatty acid ($C_{8-22}$) esters, ethylene glycol fatty acid ($C_{8-22}$) esters, propylene glycol fatty acid ($C_{8-22}$) esters, sucrose fatty acid ($C_{8-22}$) esters, pentaerythritol fatty acid ($C_{8-22}$). esters, trimethylolpropane fatty acid ($C_{8-22}$) esters, polyglycerin fatty acid ($C_{8-22}$) esters, polyoxyethylene (e.g., 20 moles) glycerin fatty acid ($C_{8-22}$) esters, polyoxyethylene (e.g., 20 moles) sorbitan fatty acid ($C_{8-22}$) esters, polyethylene glycol fatty acid ($C_{8-18}$) esters and polypropylene glycol fatty acid ($C_{8-18}$) esters. Among them, particularly preferred are pentaerythritol stearic acid ester, trimethylolpropane lauric acid ester, diglycerin stearic acid ester and the like.

Preferred polyoxyethylene higher alkyl ethers are addition products of a higher alcohol having about 12 to about 22 carbon atoms with about 1 to 20 moles of ethylene oxide.

Preferred polyoxyethylene alkyl phenyl ethers are addition products of a phenol having an alkyl group having about 1 to 18 carbon atoms with about 1 to 20 moles of ethylene oxide.

Preferred aliphatic hydrocarbons are liquid paraffins, synthetic paraffins, coumarone resins, indene resins, white mineral oil, petroleum resins, hydrogenated petroleum resins, petroleum waxes, microcrystalline waxes, montan waxes, polyethylene waxes, polypropylene waxes, odorless light petroleum hydrocarbons, and the like. Among them, particularly preferred are polyolefin waxes such as polyethylene waxes (preferably having a number average molecular weight of 400 to 8,000) and polypropylene waxes (preferably having a number average molecular weight of 200 to 9,000), hydrogenated petroleum resins and the like.

Examples of the oils and fats are hydrogenated edible oils and fats, hydrogenated caster oil, hydrogenated sperm oil, bran wax and the like.

Examples of the higher fatty acid amides are $C_{8-22}$ fatty acid amides, ethylenebis ($C_{14}$ to $C_{22}$ fatty acid) amides and the like.

Among the above binders, particularly preferred may be at least one organic compound selected from the group consisting of stearic acid, behenic acid, dimer acid, stearyl alcohol, behenyl alcohol, 2-hexyldecanol, 2-octyldodecanol, 2-decyltetradecanol, butyl stearate, octyl stearate, citric acid, malic acid, succinic acid, adipic acid, butanetetracarboxylic acid, citric acid mono- (di- or tri-) stearyl ester, malic acid monostearyl ester, tributyl acetylcitrate, 2-ethylhexyl adipate, octyl adipate, diisononyl adipate, lauryl adipate, bran wax, pentaerythritol stearic acid ester, trimethylolpropane lauric acid ester, diglycerin stearic acid ester, polyethylene wax, polypropylene wax and hydrogenated petroleum resins, monoglycerides such as glycerin monostearate, glycerin monolaurate and the like, and amides such as stearic acid amide, oleic acid amide and the like.

The amount of the binder is not limited insofar as the contemplated result can be achieved, and can be suitably selected according to kinds and combination of the diacetal and binder. Generally, however, a recommended amount of the binder is 1 to 100 weight parts, particularly 2 to 20 weight parts, per 100 weight parts of the starting powder of the diacetal of the formula (1). If the amount is less than 1 weight part, the contemplated granulated product can be scarcely obtained, whereas the amount exceeding 100 weight parts would not particularly give further advantages.

Granulated Diacetal Composition

The granulated diacetal composition of the invention is prepared by agitating a mixture containing the starting diacetal powder and the binder at a temperature equal to or higher than the melting point or softening point of the binder and lower than the melting point of the diacetal, and molding the obtained compound into grains, or by pulverizing the grains obtained by molding.

In preparing the mixture containing the starting diacetal powder and the binder, it is effective and preferable for improving the uniformity of the compound to use a powdery binder and to premix the starting diacetal powder with the powdery binder.

In the obtained granulated diacetal composition of the invention, the diacetal fine crystals constituting the diacetal particles have become aggregated more densely due to the pressure applied during the molding process. The binder, although coating substantially the whole or a part of the surface of each diacetal particle, simply adheres to a part or the whole of the surface of the diacetal particle. The interior of the diacetal particles is very low in binder concentration and substantially free from the binder.

The granulated diacetal composition of the invention comprises such diacetal particles which are bonded to each other by the binder and formed into grains while being compressed. The grains may be pulverized into a fine powder.

The form of the grains is not limited insofar as the contemplated effects can be achieved. Stated specifically, the grains may be in the form of granules, bulks, spheres, semispheres, connected double spheres, needles, beads, plates, cones, pyramids, rectangular parallelepipeds, cubes, hexagons, cylinders or columns, fine particles, and the like.

A recommended specific example is the diacetal composition in the form of cylinders having an average sectional diameter of 0.5 to 100 mm, preferably 0.3 to 10 mm, and an average length of 0.5 to 100 mm, preferably 0.3 to 10 mm. Other forms may have a dimension similar to the diameter of the cylindrical diacetal composition.

The molding machines for preparing the grains can be any of those conventionally used. Recommended are tableting machines in which compression ratio can be varied, mixing granulators, disintegrators, extrusion molding machines and the like When any of these molding machines is used, it is preferable to use conditions under which the starting diacetal particles are subjected to a pressure (compression) effective for aggregating the diacetal fine crystals of the starting diacetal particles more densely than before the molding, thereby forming a granulated diacetal composition having an apparent specific gravity of 0.5 or more, for example 0.5 to 1.4, in particular 0.6 to 1.4.

For example, when a tableting machine is employed, a recommended compression ratio is 1.1 to 10, in particular 2 to 7. If the compression ratio exceeds 10, the resulting granulated composition tend to have a reduced dispersibility or solubility in molten polyolefin resins.

Adjustment of the pressure is also important when the granulation is carried out by means of a granulator using extrusion molding such as piston extrusion, roll extrusion, screw extrusion or the like. It is preferable to employ conditions such that the resulting diacetal grains thus molded will have an apparent specific gravity of 0.5 or more, for example about 0.5 to 1.4.

The grains of the diacetal composition can be pulverized using an impact pulverizer such as a pin mill or a hammer mill, a jet mill pulverizer such as a fluidized bed jet mill, a vibration pulverizer, and the like. The resulting powder may be classified where necessary. The powdery diacetal composition thus obtained has an average particle size of preferably about 1 $\mu$m to about 0.5 mm, more preferably about 10 to about 500 $\mu$m.

According to a preferred embodiment of the present invention, at least one carboxylic acid metal salt, together with the binder, may be used as the components of the granulated diacetal composition, if so desired. Flow property of the granulated diacetal composition is thereby further improved.

Recommended as the carboxylic acid metal salt are lithium salt, potassium salt, calcium salt, aluminum salt, magnesium salt or zinc salt of lactic acid, a $C_{8-22}$ fatty acid or 12-hydroxystearic acid. Among them, preferred are calcium stearate, lithium stearate and lithium 2-hydroxystearate.

The carboxylic acid metal salt is recommendably used in an amount of 1 to 80 weight parts, in particular 10 to 50 weight parts, per 100 weight parts of the diacetal of the formula (1). If the amount is less than 1 weight part, it is difficult to produce the contemplated flowability improving effect. On the other hand, the use of the amount exceeding 80 weight parts gives no special advantages.

The granulated diacetal composition of the invention can be prepared, for example, by the following process.

(1) The hopper of an extrusion granulator is charged with a diacetal, a binder in the prescribed proportion to the diacetal, and if desired, the carboxylic acid metal salt or other additives for resins to be mentioned below. After premixing, the mixture is agitated with heating at a temperature equal to or higher than the melting point or softening point of the binder and lower than the melting point of the diacetal (for example, at 15 to 230° C., preferably 25 to 180° C.), giving a compound in the form of a powder or paste.

(2) After cooling the powder or paste to, for example, 15 to 120° C., preferably 25 to 100° C., or while maintaining the binder in the liquid state, the compound is extruded through a perforated disk having perforations with a diameter of 0.5 to 5 mm to give a noodle-shaped compound. The noodle-shaped compound thus extruded was cut into cylinders with a length of 1 to 5 mm. The noodle- or cylinderical compound may be dried under atmospheric pressure or reduced pressure.

Alternatively, the above powder or paste can be formed into tablets using a tableting machine.

Similarly, the granulated diacetal composition of the invention can be prepared using a disintegrator or a mixing granulator under conditions conventionally employed.

The obtained granulated diacetal composition recommendably has a hardness of 1 to 80 kg/cm$^2$, and preferably 5 to 30 kg/cm$^2$. If the hardness exceeds 80 kg/cm$^2$, the composition is difficult to disperse or dissolve in a molten polyolefin resin, tending to produce fish eyes. On the other hand, if the hardness is less than 1 kg/cm$^2$, the composition is prone to be destroyed and difficult to transfer. The "hardness" used herein means a breaking strength per unit area as determined with use of a Kiya type hardness tester KHT-20 (product of Kiya Seisakusho).

The granulated diacetal composition of the invention, which is molded in the form of grains, has a large apparent specific gravity of 0.5 or more, for example, 0.5 to 1.4, in particular about 0.6 to 1.4, regardless of the production process (molding process). Accordingly, the grain form composition is free from dust and agglomeration caused by fusion and the like, and has good flow property. Therefore, the composition provides various industrial advantages, such as prevention of bridging in hoppers, an increased flow rate in piping, facility in feeding by automatic metering and reduction in size of containers for storage or transport.

The fine powder, which is prepared by pulverizing the grains such as pellets obtained by cutting the noodle-shaped compound, tablets or the like using a pin mill, jet mill or the like, has an apparent specific gravity of 0.4 or more, for example 0.4 to 1.4, in particular 0.5 to 1.0, and does not generate dust and is excellent in flowability. Moreover, since the fine powder has no agglomeration property, it has good storage stability.

In the specification and claims, the apparent specific gravity of the grains obtained by molding is given by dividing the weight of the composition by its volume, and the apparent specific gravity of the powder-form composition obtained by pulverizing the grain-form composition is determined by the tapping close-packing method with a measuring cylinder.

When the grains obtained by molding, such as pellets obtained by cutting the noodle-shaped compound, tablets or the like, or the powder obtained by pulverizing the grains are used as an additive for polyolefin resins, the binder does not inhibit the dispersibility, solubility and activity in a molten polyolefin resin for crystallization which are inherently possessed by the diacetal, partly because the binder melts in the molten resin before the diacetal melts. However, it remains to be clarified why the granulated diacetal composition of the invention has an improved dispersibility or solubility in molten polyolefin resins. The granulated diacetal composition of the invention has an apparent specific gravity of 0.4 or more, in particular 0.5 or more, and is excellent in flow property and transferability. That is, the granulated diacetal composition of the invention is satisfactory both in flow property and dispersibility or solubility in molten resins.

Polyolefin Resin Composition

The polyolefin resin for use in the invention is a crystalline resin having a crystallinity of 5 to 100%, preferably 15 to 95%, and specifically includes polyethylene-based resins, stereoregular polypropylene-based resins and stereoregular polybutene-based resins.

The polyethylene-based resin includes high-density polyethylene, medium-density polyethylene, low-density polyethylene, linear low-density polyethylene, and ethylene copolymers with an ethylene content of 50 wt. % or more.

The polypropylene-based resin includes propylene homopolymer and propylene copolymers with a propylene content of 50 wt. % or more.

The polybutene-based resin includes butene homopolymer and butene copolymers with a butene content of 50 wt. % or more.

All the above-mentioned copolymers may be whichever of random copolymers and block copolymers. The stereoregularity of these resins may be isotactic or syndiotactic.

The comonomers which can be used for the production of the above-mentioned copolymers includes α-olefins such as ethylene, propylene, butene, pentene, hexene, heptene, octene, nonene, decene, undecene, dodecene, etc., bicyclotype monomers such as 1,4-endomethylenecyclohexene, etc., (meth)acrylic acid esters such as methyl (meth)acrylate, ethyl (meth)acrylate, etc., vinyl acetate, maleic acid and the like.

As the catalysts which can be used in the production of such polymers, those conventionally known are used without any particular limitation, and include not only the radical polymerization catalysts and Ziegler-Natta catalysts which are commonly employed in the art, but also a catalyst system comprising a combination of a transition metal compound (e.g., titanium halides such as titanium trichloride, titanium tetrachloride, etc.) as supported by a support based on a magnesium halide such as magnesium chloride, with an alkyl aluminum compound (e.g., triethyl aluminum, diethyl aluminum chloride, etc.), and various metallocene catalysts which have been rapidly developed recently.

The recommended melt flow rate (hereinafter abbreviated as "MFR"; JIS K 7210/1976) of the polyolefin resins used according to the present invention can be suitably selected according to the molding method used and the physical properties required of the molded articles, and is generally 0.01 to 200 g/10 minutes, preferably 0.05 to 100 g/10 minutes. Use of mixtures of polyolefin-based resins different in kind or in MFR can be recommended insofar as the mixtures have a MFR within the above range.

For modifying the polyolefin resin, the granulated diacetal composition of the invention is added recommendably in an amount of 0.01 to 3 phr (i.e., 0.01 to 3 weight parts per 100 weight parts of the polyolefin resin), in particular 0.01 to 0.3 phr, calculated as diacetal. The amount less than 0.01 phr results in a small nucleating effect, making it difficult to achieve resin modifying effects such as improvement in transparency, mechanical properties, etc. The amount exceeding 3 phr gives no special advantages and thus is not economical.

For preparing and molding the polyolefin resin composition, the diacetal composition of the invention and other additives for resins may be separately added to the polyolefin resin. Alternatively, additives for resins such as a radical inhibitor, an antistatic agent and the like may be first mixed with the diacetal composition of the invention to prepare a master batch. The master batch is added to the polyolefin resin, and the resulting polyolefin resin composition is molded, whereby the working efficiency of polyolefin resin molding is greatly improved.

As the additives for resins, there can be mentioned various additives listed in "The Tables of Positive Lists of Additives, edited by Japan Hygienic Olefin and Styrene Plastic Association (January, 1995), for instance. Specific examples include stabilizers [e.g., potassium sorbate, zinc 2-ethylhexanoate and like metal compounds, epoxydized soybean oil, epoxydized linseed oil and like epoxy compounds, melamine and like nitrogen compounds, trisnonylphenyl phosphite and like phosphorus compounds and dialkyl ($C_{12-18}$) 3,3'-thiodipropionate and like sulfur compounds], UV absorbers [e.g., 2,2'-dihydroxy-4-methoxybenzophenone, 2-hydroxy-4-n- octoxybenzophenone and like benzophenone series compounds and 2-(2'-hydroxy-5'-methylphenyl)benzotriazole and like benzotriazole series compounds], antioxidants [e.g., 2,6-di-tert-butyl-4-methylphenol, tetrakis[methylene-3-(3', 5'-di-tert-butyl-4'-hydroxyphenyl)propionate]methane and like phenolic compounds and 2,4-di-tert-butylphenylphosphite and like phosphorus compounds], silicone oils [e.g., dimethyl polysiloxane and methyl phenyl polysiloxane], fillers [e.g., clay, kaolin, talc, hydrotalcite, mica, zeolite, perlite, diatomaceous earth, calcium carbonate, glass (beads, fibers) and wood flour], blowing agents, auxiliary blowing agents, crosslinking agents, crosslinking accelerators, antistatic agents, flame retardants, dispersants, processing aids, and so forth.

For preparing the polyolefin resin composition of the present invention, in particular the polyolefin resin composition pellets, a process can be employed which comprises, for example, melting a mixture comprising the polyolefin resin, the diacetal composition of the invention, and where necessary, calcium stearate or the above additives, in a conventional manner, for example in an extruder generally at about 180 to about 270° C., preferably about 220 to about 250° C. to form a uniform molten resin composition, extruding the composition, cooling the extruded product to about 120 to 20° C. and cutting the product.

Polyolefin Resin Molded Article

For molding the polyolefin resin composition of the invention, any of conventional molding processes are usable, which include injection molding, extrusion molding, blow molding, injection blow molding and the like.

In any process, the molding machine is set at a molten resin temperature of 200 to 300° C., preferably 220 to 250° C., and the composition is molded by carrying out the melting and kneading step, extrusion step, and cooling step. The temperature for cooling is 10 to 100° C., preferably 20 to 60° C.

It is also preferable to prepare a molded article by preparing sheets by extrusion molding and vacuum forming the sheets with heating at a temperature around the melting point of the resin, i.e., at 120 to 170° C., preferably 140 to 160° C.

The molded article is improved in transparency, gloss and rigidity and can be prepared at a higher molding rate. Accordingly, the article can be formed into syringes, connectors, bags, bottles or cases, and finds wide use in medical equipment, physical and chemical equipment, garment cases, food containers, tape cases, cases for tools or instruments, etc.

EXAMPLES

The following Examples illustrate the present invention in further detail. The hardness and flow property of the diacetal composition and the average particle size of the diacetal powder were determined and evaluated as follows.

(1) Hardness (ka/cm$^2$)

The hardness (breaking strength) of the granulated diacetal composition was measured with a Kiya type hardness tester KHT-20 (product of Kiya Seisakusho) and converted into the value per unit area. The measurement and calculation was carried out 10 times, and the average value was calculated from the obtained values.

(2) Flow Property

A 4 g quantity of the sample was evenly placed on the area extending along one side wall of a clean stainless steel vat having a length of 17 cm (L cm), a width of 13 cm and a depth of 1 cm. The vat was inclined by raising the sample-holding side by 1 cm and maintained at the position for 30 seconds. This procedure was repeated to find the height of the raised side from the horizontal plane at which substantially all the sample had run down to the opposite side. The above test was carried out 3 times to determine the average (H cm). The angle ($\theta$) between the horizontal plane and the basal plane of the vat at which substantially all the sample had run down was calculated from the values of L and H [$\theta=\sin^{-1}(H/L)$] and used as a flowability index. The smaller the H value (i.e., $\theta$ value), the better the flowability.

(3) Average Particle Size of Diacetal Powder

The average particle size ($\mu$m) of the diacetal powder was determined using a particle size distribution measuring apparatus with laser diffraction/scattering "LA-910" (trade name, product of Horiba Seisakusho).

(4) Apparent Specific Gravity of Granulated Diacetal Composition

The apparent specific gravity of the diacetal composition in the form of cylinders is determined by measuring the size of the cylinder with a vernier caliper to determine the volume, measuring the accurate weight of said cylinderical composition, and dividing the weight by the volume.

The apparent specific gravity of the powdery diacetal composition was determined by a tapping close-packing method with a 100 ml measuring cylinder.

(5) Storage Stability Test

A 100 g quantity of the granulated diacetal composition immediately after preparation was placed in a paper bag and allowed to stand in a Geer oven at 60° C. for 3 days with a load of 1 kg/cm$^2$ applied to the whole composition. The bag was then taken out from the oven and allowed to cool to room temperature, and the composition was visually inspected for blocking (agglomeration of the test granulated diacetal composition as by fusion to form larger grains).

In each Example, the fact that the binder coated the diacetal particles constituting the granulated diacetal composition but did not penetrate thereinto was confirmed by the following test.

The sample was observed under a crossed Nicol of a polarizing microscopy while raising the temperature at a rate of 1° C./min. It was confirmed that the diacetal particles did not melt when the binder melted, and that the solid diacetal and liquid binder formed a two-phase structure. According to the microscopic observation, portions having a high binder concentration had a dark appearance, whereas diacetal portions had a light appearance. The confirmation of the two-phase structure revealed that the binder did not penetrate into the diacetal particles.

Example 1

(a) 10 weight parts of polypropylene wax (number average molecular weight 4000, m.p.=160° C.) was added to 100 weight parts of 1,3:2,4-bis-O-(benzylidene)sorbitol fine powder with an average particle size of 5 $\mu$m, and premixing was carried out at room temperature to obtain a uniform mixture. While heating to 180° C. to thereby melt the binder, the mixture was agitated to prepare a powder whose particles were coated with the polypropylene wax.

Subsequently, while cooling to 40° C., the powder was extruded using an extrusion granulator (Eck pelletor, product of Fuji Denki Kogyo Co., Ltd.) through a perforated disk having perforations with a diameter of 5 mm, giving a noodle-shaped composition.

The obtained noodle-shaped composition was cut into lengths of 5 mm, whereby a diacetal composition in the form of cylindrical particles with an average sectional diameter of 5 mm and an average length of 5 mm.

The obtained composition had a hardness of 15 kg/cm$^2$, an H value of 11 cm ($\theta$=40°), and an apparent specific gravity of 1.0. When the composition was tested for storage stability, no blocking was found.

(b) Weighed out and dryblended were 100 weight parts of random polypropylene (ethylene-propylene random copolymer with an ethylene content of 3 weight %; MFR=6 g/10 min.), 0.03 weight part of calcium stearate, 0.03 weight part of Irganox 1010 (trade name, product of Ciba Geigy), 0.01 weight part of Irgafos 168 (trade name, product of Ciba Geigy) and 0.25 weight parts of the diacetal composition obtained above.

During weighing and dryblending, no dust was observed generated from the diacetal composition.

Thereafter, the dryblend was agitated at 240° C. in an extruder to obtain a uniform melt, which was then extruded to give molten resin strands. The strands were quenched with water at 30° C. and cut into pellets.

(c) A melt at 250° C. prepared from the above pellets was injection-molded at a mold temperature of 40° C., giving sheets with a thickness of 1.0 mm.

The transparency of the 1.0 mm-thick sheets was measured using a haze meter according to JIS K 7105. The obtained haze value was 15.0, indicating that a sufficient transparency improving effect was exhibited.

Example 2

The diacetal composition in the form of cylinders with an average sectional diameter of 5 mm and an average length of 7 mm was prepared in the same manner as in Example 1 except that 100 weight parts of 1,3:2,4-bis-O-(p-methylbenzylidene)sorbitol fine powder with an average particle size of 10 μm was used in place of 100 weight parts of 1,3:2,4-bis-O-(benzylidene)-sorbitol fine powder with an average particle size of 5 μm, and that 14 weight parts of stearyl monoglyceride and 1 weight part of citric acid were used as the binder in place of 10 weight parts of the polypropylene wax.

The obtained composition had a hardness of 25 kg/cm$^2$, an H value of 12 cm ($\theta$=45°), and an apparent specific gravity of 1.1. When the composition was tested for storage stability, no blocking was observed.

(b) A polypropylene resin composition was prepared in the same manner as in Example 1 with the exception of using the above obtained diacetal composition in the form of cylinders.

During weighing and dryblending, no dust was observed generated from the diacetal composition.

(c) Sheets were prepared in the same manner as in Example 1 with the exception of using the above obtained resin composition, and tested for transparency. The haze value of the sheets was 10.0.

Example 3

A diacetal composition in the form of cylinders with an average sectional diameter of 3 mm and an average length of 3 mm was prepared in the same manner as in Example 1 except that 100 weight parts of 1,3:2,4-bis-O-(3,4-dimethylbenzylidene)sorbitol fine powder with an average particle size of 5 μm was used in place of 100 weight parts of 1,3:2,4-bis-O-(benzylidene)sorbitol fine powder with an average particle size of 5 μm, and that 7 weight parts of hydrogenated castor oil and 5 weight parts of stearic acid amide were used as the binder in place of 10 weight parts of polypropylene wax.

The obtained composition had a hardness of 10 kg/cm$^2$, an H value of 11 cm ($\theta$=40°) and an apparent specific gravity of 1.1. When the composition was tested for storage stability, no blocking was observed.

(b) A resin composition was prepared in the same manner as in Example 1 with the exception of using the above obtained diacetal composition in the form of cylinders.

During weighing and dryblending, no dust was observed generated from the diacetal composition.

(c) Sheets were prepared in the same manner as in Example 1 with the exception of using the above obtained resin composition, and tested for transparency. The haze value of the sheets was 10.3.

Example 4

A diacetal composition in the form of cylinders with an average sectional diameter of 5 mm and an average length of 5 mm was prepared in the same manner as in Example 1 except that 100 weight parts of 1,3:2,4-bis-O-(benzylidene)sorbitol fine powder with an average particle size of 20 μm was used in place of 100 weight parts of 1,3:2,4-bis-O-(benzylidene)sorbitol fine powder with an average particle size of 5 μm, that 10 weight parts of stearic acid was used as the binder in place of 10 weight parts of polypropylene wax, and that 12 weight parts of calcium stearate was additionally used.

The obtained composition had a hardness of 13 kg/cm$^2$, an H value of 7 cm ($\theta$=24°), and an apparent specific gravity of 1.0. When the composition was tested for storage stability, no blocking was observed.

(b) A resin composition was prepared in the same manner as in Example 1 with the exception of using the above obtained diacetal composition in the form of cylinders.

During weighing and dryblending, no dust was observed generated from the diacetal composition.

(c) Sheets were prepared in the same manner as in Example 1 with the exception of using the above obtained resin composition, and tested for transparency. The haze value of the sheets was 15.0.

Example 5

A diacetal composition with an average sectional diameter of 5 mm and an average length of 5 mm was prepared in the same manner as in Example 1 except that 1,3:2,4-bis-O-(p-ethylbenzylidene)sorbitol fine powder with an average particle size of 10 μm was used in place of 1,3:2,4-bis-O-(benzylidene)sorbitol fine powder with an average particle size of 5 μm, and that 3 weight parts of succinic acid and 5 weight parts of stearic acid were used as the binder in place of 10 weight parts of polypropylene wax.

The obtained composition had a hardness of 6 kg/cm$^2$, an H value of 11 cm ($\theta$=40°), and an apparent specific gravity of 0.8. When the composition was tested for storage stability, no blocking was observed.

(b) A resin composition was prepared in the same manner as in Example 1 with the exception of using 0.3 weight parts of the above obtained diacetal composition in the form of cylinders.

During weighing and dryblending, no dust was observed generated from the diacetal composition.

(c) Sheets having a thickness of 1.0 mm were prepared in the same manner as in Example 1 with the exception of using the above obtained resin composition, and tested for transparency. The haze value of the sheets was 11.5, indicating that a sufficient transparency improving effect was achieved.

Comparative Example 1

A resin composition was prepared in the same manner as in Example 1 with the exception of using 1,3:2,4-bis-O-(benzylidene)sorbitol fine powder with an average particle size of 5 µm and an apparent specific gravity of 0.18 in place of the diacetal composition in the form of cylinders.

When the 1,3:2,4-bis-O-(benzylidene)sorbitol fine powder was weighed out and dryblended with other components, dust generation was observed. The H value of the 1,3:2,4-bis-O-(benzylidene)sorbitol fine powder was 16 cm (θ=70°).

When the 1,3:2,4-bis-O-(benzylidene)sorbitol fine powder was tested for storage stability, blocking was observed.

Further, sheets were prepared in the same manner as in Example 1 with the exception of using the above obtained resin composition, and tested for transparency. The haze value was 15.5.

Comparative Example 2

Sheets were prepared in the same manner as in Example 1 with the exception of using no diacetal composition, and tested for transparency. The haze value was 65.0.

Comparative Example 3

The procedure of Example 1 of Japanese Unexamined Patent Publication No. 126352/1989 was followed. That is, a mixture of equal weights of behenic acid and stearic acid was dissolved in methanol to obtain 160 g of a solution having a concentration of 25 weight %. The solution was heated to 60° C., and 1.2 g of adduct of cetyl alcohol with 10 moles of ethylene oxide was added as a surfactant. 150 g of warm water was slowly added to the resulting mixture to obtain an emulsion. To the emulsion was added 60 g of 1,3:2,4-bis-O-(p-methylbenzylidene)sorbitol powder, and the resulting mixture was stirred, filtered, washed with warm water and dried, giving 98 g of a powdery diacetal composition.

The particles of the composition was coated with fatty acid. The composition had an apparent specific gravity of 0.35.

The composition was tested for storage stability, resulting in serious blocking. The blocking was caused presumably by fusion of the higher fatty acid serving as a coating material and constituting 40 weight % of the whole powdery composition.

INDUSTRIAL APPLICABILITY

Compared with the conventional fine powders, the conversion of the form of the diacetal into grains according to the present invention suppresses dust generation, provides remarkably improved working environments, imparts improved storage stability and facilitates automatic metering and transfer, while retaining inherent properties of diacetals.

What is claimed is:

1. A granulated diacetal composition comprising a powder of a diacetal represented by the formula (1)

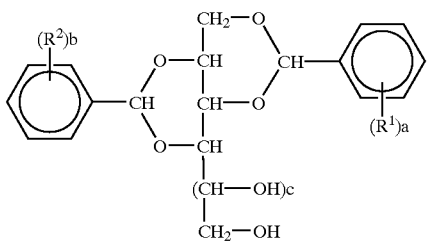

wherein $R^1$ and $R^2$ are the same or different and each represents a hydrogen atom, an alkyl group having 1 to 4 carbon atoms, an alkoxy group having 1 to 4 carbon atoms, or a halogen atom, a and b each represent an integer of 1 to 5, and c represents 0 or 1, and a binder, the granulated diacetal composition being prepared by agitating a mixture containing a starting powder of the diacetal represented by the formula (1) and the binder at a temperature equal to or higher than the melting point or softening point of the binder and lower than the melting of the diacetal, and molding the resulting compound into grains, the diacetal particles in the granulated diacetal composition being bonded to each other via the binder and aggregated, the binder in the granulated diacetal composition coating a part or the whole of the surface of each diacetal particle or adhering to a part or the whole of the surface of each diacetal particle, the granulated diacetal composition prepared by molding the compound into grains having an apparent specific gravity of 0.5 to 1.4.

2. The granulated diacetal composition according to claim 1, wherein the binder is at least one organic compound having a melting point or softening point equal to or lower than the melting point of the diacetal.

3. The granulated diacetal composition according to claim 1, wherein the binder is at least one organic compound selected from the group consisting of higher fatty acids, higher alcohols, polypropylene glycols, fatty acid alkyl esters, polycarboxylic acids which may have one hydroxyl group, esters of polycarboxylic acids which may have one hydroxyl group, polyhydric alcohol fatty acid esters, polyloxyethylene higher alkyl ethers, polyoxyethylene alkylphenyl ethers, aliphatic hydrocarbons, oils, fats, higher fatty acid amides, rosins and rosin derivatives.

4. A granulated diacetal composition according to claim 1, wherein the binder is at least one organic compound selected from the group consisting of stearic acid, behenic acid, dimer acid, adipic acid, butanetetracarboxylic acid, citric acid, malic acid, succinic acid, stearyl alcohol, behenyl alcohol, 2-hexyl decanol, 2-octyldodecanol, 2-decyltetradecanol, butyl stearate, octyl stearate, citric acid mono- (di- or tri-) stearyl ester, malic acid monostearyl ester, tributyl acetylcitrate, 2-ethylhexyl adipate, octyl adipate, diisononyl adipate, lauryl adipate, bran wax, pentaerythritol stearic acid ester, trimethylolpropane lauric acid ester, diglycerin stearic acid ester, polyethylene wax, polypropylene wax, hydrogenated petroleum resin, glyceryl monostearate, stearic acid amide and oleic acid amide.

5. A granulated diacetal composition according to claim 1, wherein the binder is used in an amount of 1 to 100 weight parts per 100 weight parts of the starting diacetal powder.

6. A granulated diacetal composition according to claim 1, which is obtained by molding the compound into grains and has an apparent specific gravity of 0.6 to 1.4.

7. A granulated diacetal composition according to claim 1, which has a hardness of 1 to 80 kg/cm² wherein hardness means breaking strength as determined using a Kiya type hardness tester KHT-20.

8. A granulated diacetal composition according to claim 1, which has a hardness of 5 to 30 kg/cm² wherein hardness means breaking strength as determined using a Kiya type hardness tester KHT-20.

9. A granulated diacetal composition according to claim 1, which is in the form of cylinders having an average sectional diameter of 0.5 to 100 mm and an average length of 0.5 to 100 mm.

10. A granulated diacetal composition according to claim 1, which further contains at least one carboxylic acid metal salt selected from the group consisting of lithium salt, potassium salt, calcium salt, aluminum salt, magnesium salt and zinc salt of lactic acid, a $C_{8-22}$ fatty acid and 12-hydroxystearic acid.

11. A polyolefin resin composition prepared by heating and melting a mixture comprising (a) a polyolefin resin and (b) a granulated diacetal composition, and extruding the resulting molten polyolefin resin composition to form pellets, the granulated diacetal composition comprising a powder of a diacetal represented by the formula (1)

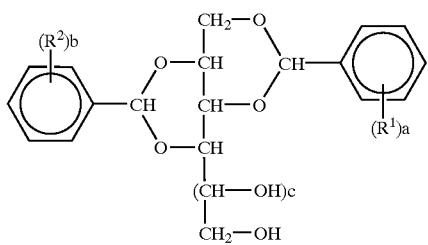

wherein $R^1$ and $R^2$ are the same or different and each represents a hydrogen atom, an alkyl group having 1 to 4 carbon atoms, an alkoxy group having 1 to 4 carbon atoms or a halogen atom, a and b each represent an integer of 1 to 5, and c represents 0 or 1, and a binder, the granulated diacetal composition being prepared by agitating a mixture containing a starting powder of the diacetal represented by the formula (1) and the binder at a temperature equal to or higher than the melting point or softening point of the binder and lower than the melting point of the diacetal, and molding the resulting compound into grains, the diacetal particles of the diacetal powder in the granulated diacetal composition being bonded to each other via the binder and aggregated, the binder in the granulated diacetal composition coating a part or the whole of the surface of each diacetal particle or adhering to a part or the whole of the surface of each diacetal particle, the granulated diacetal composition prepared by molding the compound into grains having an apparent specific gravity of 0.5 to 1.4.

12. A polyolefin resin composition according to claim 11, wherein the granulated diacetal composition is present in an amount of 0.01 to 3 weight parts per 100 weight parts of the polyolefin resin, calculated as the diacetal of the formula (1).

13. A polyolefin resin composition according to claim 11, wherein the binder is at least one organic compound having a melting point or softening point equal to or lower than the melting point of the diacetal.

14. A polyolefin resin composition according to claim 11, wherein the binder is at least one organic compound selected from the group consisting of higher fatty acids, higher alcohols, polypropylene glycols, fatty acid alkyl esters, polycarboxylic acids which may have one hydroxyl group, esters of polycarboxylic acid which may have one hydroxyl group, polyhydric alcohol fatty acid esters, polyoxyethylene higher alkyl ethers, polyoxyethylene alkyl phenyl ethers, aliphatic hydrocarbons, oils, fats, higher fatty acid amides, rosins and rosin derivatives.

15. A polyolefin resin composition according to claim 11, wherein the binder is at least one organic compound selected from the group consisting of stearic acid, behenic acid, dimer acid, adipic acid, butanetetracarboxylic acid, citric acid, malic acid, succinic acid, stearyl alcohol, behenyl alcohol, 2-hexyl decanol, 2-octyldodecanol, 2-decyltetradecanol, butyl stearate, octyl stearate, citric acid mono- (di- or tri-) stearyl ester, malic acid monostearyl ester, tributyl acetylcitrate, 2-ethylhexyl adipate, octyl adipate, diisononyl adipate, lauryl adipate, bran wax, pentaerythritol stearic acid ester, trimethylolpropane lauric acid ester, diglycerin stearic acid ester, polyethylene waxes, polypropylene waxes, hydrogenated petroleum resins, glyceryl monostearate, stearic acid amide and oleic acid amide.

16. A polyolefin resin composition according to claim 11, wherein the binder is used in an amount of 1 to 100 weight parts per 100 weight parts of the starting diacetal powder.

17. A polyolefin resin composition according to claim 11, wherein the granulated diacetal composition is prepared by molding the compound into grains and has an apparent specific gravity of 0.6 to 1.4.

18. A polyolefin resin composition according to claim 11, wherein the granulated diacetal composition has a hardness of 1 to 80 kg/cm² wherein hardness means breaking strength as determined using a Kiya type hardness tester KHT-20.

19. A polyolefin resin composition according to claim 11, wherein the granulated diacetal composition has a hardness of 5 to 30 kg/cm² wherein hardness means breaking strength as determined using a Kiya type hardness tester KHT-20.

20. A polyolefin resin composition according to claim 11, wherein the granulated diacetal composition is in the form of cylinders having an average sectional diameter of 0.5 to 100 mm and an average length of 0.5 to 100 mm.

21. A polyolefin resin composition according to claim 11, wherein the granulated diacetal composition further contains at least one carboxylic acid metal salt selected from the group consisting of lithium salt, potassium salt, calcium salt, aluminum salt, magnesium salt and zinc salt of lactic acid, a $C_{8-22}$ fatty acid and 12-hydroxystearic acid.

22. A process for preparing a granulated diacetal composition in the form of grains obtained by molding, the grains comprising a powder of a diacetal represented by the formula (1)

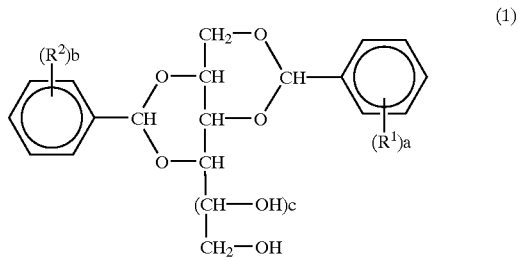

wherein $R^1$ and $R^2$ are the same or different and each represent a hydrogen atom, an alkyl group having 1 to 4 carbon atoms, an alkoxy group having 1 to 4 carbon atoms, or a halogen atom, a and b each represent an integer of 1 to 5 and c represents 0 or 1, and a binder, the diacetal particles of the diacetal powder being bonded to each other via the binder and aggregated, the binder coating a part or the whole of the surface of each diacetal particle or adhering to a part or the whole of the surface of each diacetal particle, the process comprising the steps of (i) agitating a mixture containing a starting powder of the diacetal represented by the formula (1) and the binder at a temperature equal to or higher than the melting point or softening point of the binder and lower than the melting point of the diacetal, and (ii) molding the obtained compound into grains.

* * * * *